United States Patent [19]
Miller, Jr.

[11] 4,229,054
[45] Oct. 21, 1980

[54] MULTI-PAD COMPLIANT HYDRODYNAMIC JOURNAL BEARING

[75] Inventor: William H. Miller, Jr., Schenectady, N.Y.

[73] Assignee: Mechanical Technology Incorporated, Latham, N.Y.

[21] Appl. No.: 974,261

[22] Filed: Dec. 29, 1978

[51] Int. Cl.³ .................... F16C 32/06; F16C 27/02
[52] U.S. Cl. .................................. 308/9; 308/121; 308/DIG. 1
[58] Field of Search .................... 308/9, 26, 36.3, 121, 308/122, 240, DIG. 1, DIG. 4, DIG. 15, 73; 29/149.5 A

[56] References Cited

U.S. PATENT DOCUMENTS

| | | |
|---|---|---|
| 3,809,443 | 5/1974 | Cherubim ............................ 308/9 |
| 3,884,534 | 5/1975 | Winn .................................. 308/9 |
| 4,118,079 | 10/1978 | Newman et al. ............... 308/DIG. 1 |
| 4,133,585 | 1/1979 | Licht .................................. 308/121 |

FOREIGN PATENT DOCUMENTS

2723169 12/1977 Fed. Rep. of Germany .............. 308/9
2723170 12/1977 Fed. Rep. of Germany .............. 308/9

*Primary Examiner*—Richard R. Stearns
*Attorney, Agent, or Firm*—Joseph V. Claeys; John M. Neary

[57] ABSTRACT

A multi-pad compliant hydrodynamic fluid journal bearing includes three bearing modules spaced uniformly around a bearing sleeve. Each module includes a resilient supporting element formed in a corrugated pattern to provide spaced resilient support projections for an overlying bearing sheet having a bearing surface which faces the rotating shaft. One end of the sheet is welded to one end of the supporting element with an intervening spacer block having a recess in the center thereof. The other end of the bearing sheet includes a tongue which lies under the bearing sheet of the adjacent module within the recess of the spacer block of that module.

11 Claims, 3 Drawing Figures

U.S. Patent
Oct. 21, 1980
4,229,054
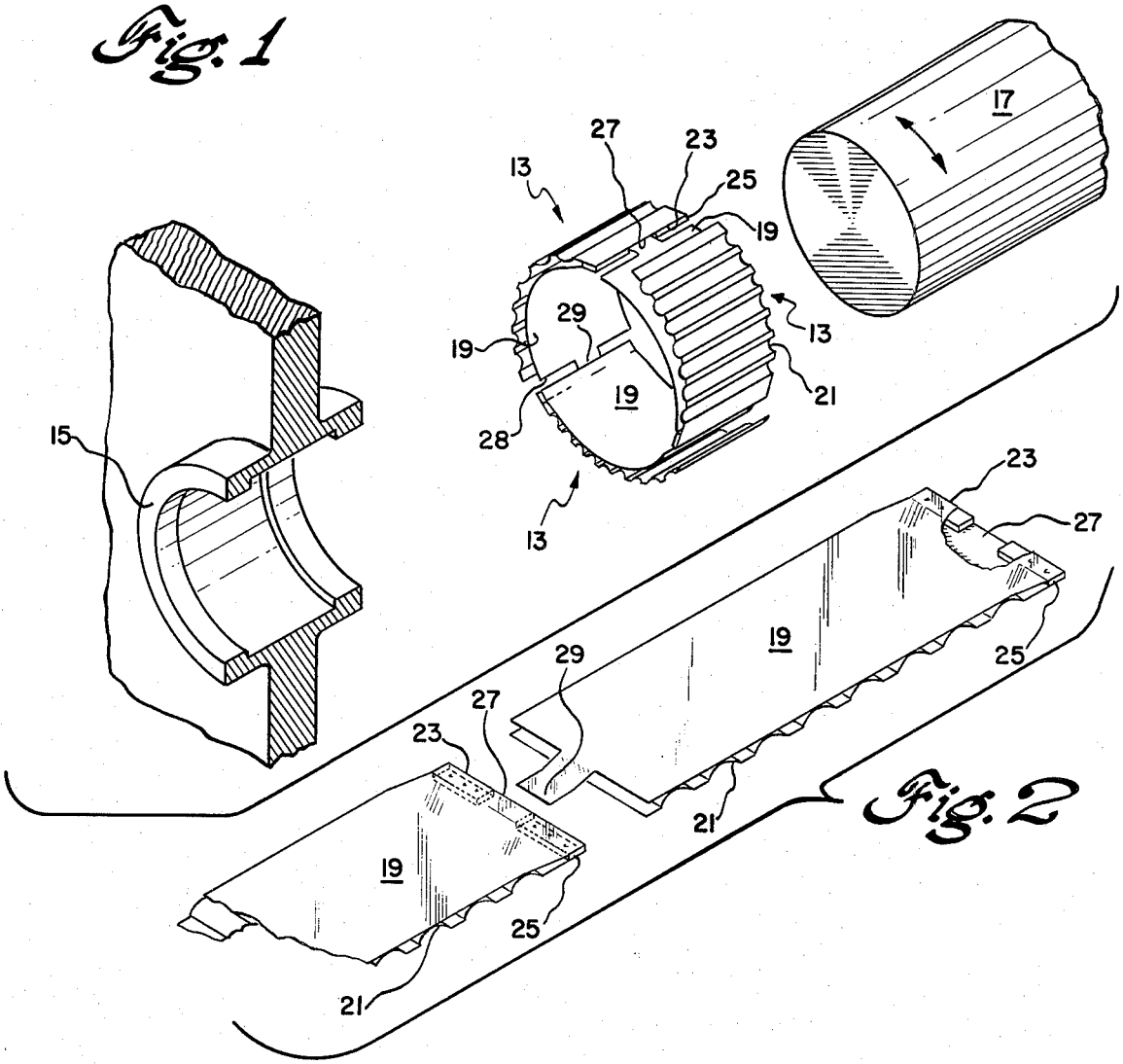
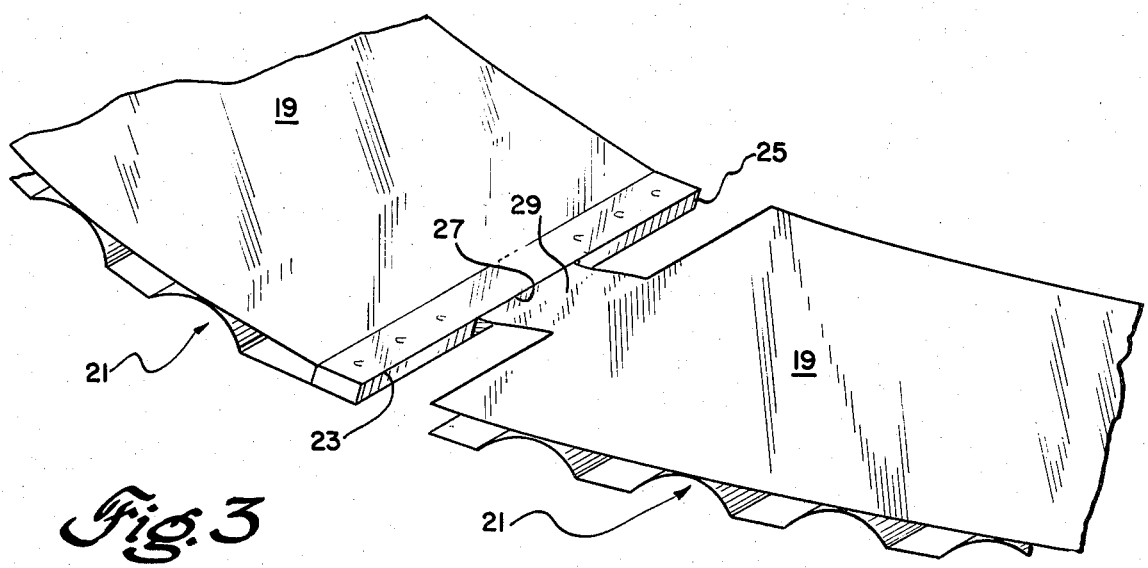

MULTI-PAD COMPLIANT HYDRODYNAMIC JOURNAL BEARING

BACKGROUND OF THE INVENTION

The fast-developing field of compliant hydrodynamic fluid bearings has seen more and more acceptance by the art for many applications. These bearings are very low cost and provide excellent low friction characteristics and extremely long life in ultra high speed applications. They are superior to conventional ball bearings and sleeve bearings in many applications, but recent research has identified certain technical improvements which can be made to broaden their implementation.

Many compliant hydrodynamic journal bearings are unidirectional; that is, they must be used with a shaft rotation in only one direction. This requires that the assembly of the bearing be done with some care to assure that the bearing be oriented correctly. It also makes these bearings unsuitable for bidirectional shaft rotation applications.

Prior art attempts to develop a bidirectional journal bearing have suffered from instability and/or loss of load carrying capacity. I believe this has occured because these designs have failed to provide sufficient freedom of movement of the bearing sheet to enable it to flex and conform to the shaft.

Another improvement which I believe could be made to compliant hydrodynamic fluid bearings is a reduction in their start-up torque. Because the bearing sheet is free, it tends to wrap around the shaft. The start-up torque is somewhat higher than that of conventional bearings, and the shaft can be rotated only in one direction. These improvements should contribute to making these bearings more suitable to a broader range of applications than presently exists, and should facilitate an accelerated acceptance by the art of these bearings.

SUMMARY OF THE INVENTION

Accordingly, an object of this invention is to provide a stable compliant hydrodynamic fluid film bearing and method which can be used in ultra-high speed applications. Another object is to provide a bearing of this nature having low start-up torque for the shaft. An additional object of this invention is to provide a bearing of this nature which can accept shaft rotation in both directions.

These and other objects of the invention are achieved by one embodiment of the invention wherein the journal bearing is formed of three bearing modules which are spaced uniformly around the bearing sleeve. Each module includes a resilient support element and an overlying bearing sheet, attached together at one end with an intervening spacer block having formed therein a centrally disposed recess. The other end of the bearing sheet has a projecting tongue which extends under the bearing sheet of the next adjacent module in the recess formed in the central area of the spacer block for that module. This arrangement provides a series of interruptions of the bearing sheet so that the half-speed fluid whirl does not develop, and yet the bearing area is nearly as great as the entire circumference of the bearing sleeve to give good load-carrying capacity. The tongue on the end of each of the bearing sheets holds the bearing sheet radially outward against the resilient support element to control the bearing clearance and prevent the bearing sheet from extending inwardly against the shaft so that the start-up torque is reduced and the shaft is free to rotate in either direction.

DESCRIPTION OF THE DRAWINGS

The objects of the invention and the invention itself will become more clear upon reading the following description of the preferred embodiment in conjunction with an examination of the following drawings, wherein:

FIG. 1 is an exploded perspective view showing the bearing of this invention, and the bearing sleeve and shaft with which it is to be used;

FIG. 2 is an enlarged perspective view of one bearing module formed in accordance with this invention; and FIG. 3 is an enlarged perspective view of the area between two adjacent bearing modules installed in the bearing sleeve.

DESCRIPTION OF THE PREFERRED EMBODIMENT

Referring now to the drawings, wherein like reference characters designate identical or corresponding parts, and more particularly to FIG. 1 thereof, a journal bearing is shown having a series of three bearing modules 13 spaced equally around a bearing sleeve 15. The bearing sleeve 15 receives a bidirectional rotatable shaft 17 with an interstitial gap therebetween. The bearing modules 13 are received in this gap.

Each bearing module includes a bearing sheet 19 and an underlying resilient support element 21. One end 23 of the bearing sheet 19 is fastened as by resistance welding to one end of the resilient support element 21 with an intervening spacer block 25 positioned between the ends of the bearing sheet and the support element 21. The spacer block 25 can be formed of two spaced pieces, or can be provided with a recess 27 formed centrally therein for a purpose which will appear presently. The ends 23 of the bearing modules are attached to the bore wall of the sleeve 15 at 120° spaced positions around the sleeve by welding or other suitable means which will hold the modules in place against rotation relative to the sleeve 15.

The other end 28 of the bearing sheet 19 has formed thereon a centrally disposed projecting tongue 29. In the assembled bearing, the bearing modules are dimensioned to fit within the bearing sleeve with the tongue 29 of the bearing sheet projecting into the recess 27 of the next adjacent module. This is shown most clearly in FIG. 3. The tongue prevents the free end 28 of the bearing sheet 19 from lifting radially inward against the shaft surface so that the bearing clearance is controlled and the bearing sheets 19 are restrained from wrapping around the rotating shaft. Thus, the start-up torque of this bearing is reduced to a small value and the shaft is enabled to rotate in either direction. The space between the end 28 of one bearing sheet 19 and the beginning of the next bearing module is effective to prevent the establishment of the half-speed whirl phenomena so that the bearing can be run at and above the speeds at which half-speed whirl is normally encountered.

Certain modifications of this embodiment are contemplated. For example, the modules could be made with the spacer block 25 disposed in the middle of the module, and the bearing sheet and resilient support element extending in opposite directions therefrom, so the bearing sheet of one module overlaps the resilient support element of the next. Also, in bearings wherein the bearing sheet 19 is wide, it may be desirable to provide more than one tongue 29 on the end of the bearing sheet. In addition, it might be desirable to extend the end 23 of the bearing sheet beyond the spacer block 25 to provide a slight overhang, and to tuck the end of the adjacent bearing sheet under this overhang. An important feature is that the end of the bearing sheet 19 be unrestrained against circumferential movement with respect to the bearing sleeve 15, while being restrained radially against movement inward against the shaft surface.

Obviously, numerous other modifications and variations of the invention are possible in view of this disclosure, and it is expressly to be understood that these modifications and their equivalents may be practiced while remaining within the spirit and scope of the invention which is defined by the appended claims, wherein

I claim:

1. A compliant hydrodynamic fluid journal bearing comprising:
   a bearing sleeve having a cylindrical bore therein;
   a rotatable shaft received within said bore and defining a gap between the wall of said bore and the surface of said shaft;
   a plurality of bearing modules received within said gap and circumferentially spaced around said wall of said bearing sleeve, and attached thereto against rotation relative to said bearing sleeve;
   each of said modules including a bearing sheet having a radially inwardly facing bearing surface and a resilient support element having spaced resilient projections for supporting a bearing sheet for resilient deflection under load variations exerted by said shaft;
   said bearing sheet being attached adjacent one end thereof to one end of said resilient support elememt with a spacer element connected to said ends;
   the other end of said bearing sheet having a portion underlying portions of the adjacent module to restrain said bearing sheet other end from lifting radially inward toward said shaft while permitting relative circumferential movement of said bearing sheets and said resilient support elements;
   whereby said bearing includes bearing surface interruptions where said bearing sheet portion underlies said adjacent module portions to interrupt incipient half-speed whirl and said bearing sheet is radially restrained from wrapping around said shaft so that start-up torque for said shaft is held to a low value, and said shaft is free to rotate in either direction with respect to said bearing sheets.

2. The bearing defined in claim 1, wherein said bearing sheet of each module overlies the resilient support element of that same module, and said spacer element is attached at an end of the module.

3. The bearing defined in claim 1, wherein said spacer elements have formed centrally therein a recess, and said bearing sheets have formed on the free end thereof a projecting tongue which lies within said recess for said radial restraint.

4. The bearing defined in claim 1, wherein three of said modules are attached to said bearing sleeve at evenly spaced positions therearound, one every 120°.

5. The bearing defined in claim 1, wherein the bearing sheet and resilient support element of each module are attached to opposite faces of said spacer element at one end of said module, said spacer element having a recess formed therein for receiving a tongue on the free end of the bearing sheet on the next adjacent module.

6. The bearing defined in claim 5, wherein said spacer element includes two axially spaced blocks; said recess being bounded on three sides by the adjacent sides of said blocks and the underside of said bearing sheet where it is connected to said blocks.

7. The bearing defined in claim 6, wherein three of said modules are attached to said bearing sleeve at evenly spaced positions therearound, one every 120°.

8. The bearing defined in claim 1, wherein each of said modules have two circumferential ends, one of said ends being defined by said one end of said bearing sheet and the other end of said module being defined by the other end of said bearing sheet.

9. The bearing defined in claim 8, wherein each of said bearing modules has one radial face of said spacer element welded to the radially outwardly facing surface of said bearing sheet at said one end thereof, and the other radial face of said spacer element is welded to the radially inwardly facing surface of said resilient support element at one end thereof.

10. The bearing defined in claim 9, wherein said bearing sheet other end has formed thereon a tongue, and said spacer element includes two axially spaced blocks; said tongue received within a recess defined by the adjacent sides of said blocks and the underside of said bearing sheet where it is connected to said blocks.

11. A method of dynamically supporting an ultra high speed rotating shaft, comprising:
   lining a journal bearing sleeve with at least one resilient, compliant support member;
   attaching said support member at one end to the bore of said sleeve;
   laying at least one bearing sheet over the top of said support member so that the entire circumference of said bore is lined with bearing sheet lying end-to-end;
   attaching said bearing sheet at one end to said one end of said support member;
   inserting a portion of the other end of said bearing sheet under a portion of said one end of said bearing sheet so that said bearing sheet is free to flex, expand and contract circumferentially and radially, but said other end of said bearing sheet is restrained against lifting radially inward against the shaft; and
   rotating said shaft in said sleeve at ultra-high speed.

* * * * *